US 8,352,464 B2

(12) United States Patent
Fotev

(10) Patent No.: US 8,352,464 B2
(45) Date of Patent: Jan. 8, 2013

(54) SYSTEM AND METHOD FOR RANKING DOCUMENTS THROUGH HUMAN ASSISTANCE

(75) Inventor: Krassimir Fotev, Harrison, NJ (US)

(73) Assignee: Peer Belt Inc., Harrison, NJ (US)

( * ) Notice: Subject to any disclaimer, the term of this patent is extended or adjusted under 35 U.S.C. 154(b) by 124 days.

(21) Appl. No.: 12/797,376

(22) Filed: Jun. 9, 2010

(65) Prior Publication Data

US 2011/0022578 A1      Jan. 27, 2011

Related U.S. Application Data

(60) Provisional application No. 61/228,200, filed on Jul. 24, 2009.

(51) Int. Cl.
*G06F 17/30* (2006.01)

(52) U.S. Cl. ........................ 707/723; 707/707

(58) Field of Classification Search .......... 707/723–728, 707/999.003, 999.01, 999.107, 706, 707
See application file for complete search history.

(56) References Cited

U.S. PATENT DOCUMENTS

| | | | |
|---|---|---|---|
| 7,065,587 B2 | 6/2006 | Huitema et al. | |
| 7,225,184 B2 | 5/2007 | Carrasco et al. | |
| 7,716,198 B2 * | 5/2010 | Meyerzon et al. | 707/706 |
| 7,716,217 B2 * | 5/2010 | Marston et al. | 707/728 |
| 7,725,465 B2 * | 5/2010 | Liao et al. | 707/728 |
| 7,783,632 B2 | 8/2010 | Richardson et al. | |
| 7,856,446 B2 | 12/2010 | Brave et al. | |
| 7,958,115 B2 * | 6/2011 | Kraft | 707/723 |
| 2005/0091202 A1 | 4/2005 | Thomas | |
| 2007/0112761 A1 * | 5/2007 | Xu et al. | 707/5 |
| 2007/0260597 A1 | 11/2007 | Cramer | |
| 2007/0294240 A1 | 12/2007 | Steele et al. | |
| 2008/0016052 A1 | 1/2008 | Frieden | |
| 2008/0097985 A1 | 4/2008 | Olstad et al. | |
| 2010/0299326 A1 * | 11/2010 | Germaise | 707/728 |
| 2010/0317444 A1 * | 12/2010 | Chandrasekar et al. | 463/43 |
| 2011/0022587 A1 * | 1/2011 | Aravamudan et al. | 707/723 |
| 2012/0016860 A1 * | 1/2012 | Jones | 707/706 |

OTHER PUBLICATIONS

Ben Y. Zhao, et al. "Tapestry."—IEEE Journal on Selected Areas in Communications, vol. 22, No. 1, Jan. 2004.
Ion Stoica, et al., "Chord." The proceedings of ACM SIGCOMM 2001, San Diego, CA, Aug. 2001.
PetarMaymounkov, et al., "Kademlia." The proceedings of 1$^{st}$ International Workshop on Peer-to-peer Systems 2002.

* cited by examiner

*Primary Examiner* — Leslie Wong
(74) *Attorney, Agent, or Firm* — Leason Ellis LLP

(57) ABSTRACT

Embodiments of system and method are provided for ranking contents of one or more documents through human assistance. The system includes one or more search engines configured to provide one or more documents based on a search query sent by a user. Further, the system includes a client application configured to capture the query sent by the user and the document tags provided by the document author or inbound links. The client application monitors one or more interactions of the user with the one or more documents for one or more events and provides a relevance measure to the one or more documents based on the captured query or tags, and the one or more events.

22 Claims, 8 Drawing Sheets

SYSTEM AND METHOD FOR RANKING DOCUMENTS THROUGH HUMAN ASSISTANCE

CROSS REFERENCE TO RELATED APPLICATION

The present application claims the benefit of U.S. patent application Ser. No. 61/228,200, filed Jul. 24, 2009, which is hereby incorporated by reference in its entirety.

FIELD OF THE INVENTION

The present invention relates to improvement in electronic document content ranking and more particularly to a computer-implemented system and method for managing user assisted ranking for document relevance recommendations and searching.

BACKGROUND OF THE INVENTION

As the amount of information available on the World Wide Web grows and search engines continue indexing the data, it becomes apparent that the limited amount of slots on the search engine result page does not always promote the most relevant documents.

At one end of the spectrum, a search engine user may provide a query that is too generic. Internet search engines like Google.com (Google Inc.), and Yahoo.com (Yahoo! Inc.) discriminate between pages before displaying the results. The discrimination is done by identifying really popular pages, pages with lots of inbound links, and pages with just few inbound links. However, the top yielded results may still appear of low quality, partially because of the inexact or too generic initial query, and partially due to the search engine considering pages with an aggressive Search Engine Optimization (SEO). At the other end of the spectrum, a too specific query will almost always yield not so "popular" results with few inbound links. Ranking these results is challenging in terms of inbound links quality. As a result, the search engine again may fall into the trap of considering primarily pages with aggressive SEO.

In the advertisement space, the too generic query problem is being addressed by identifying publication clusters with a matrix of correlation coefficients that ties together advertisers bids and search queries (e.g. U.S. Pat. No. 7,225,184 to Carasco et al. (2007>>. However, the implementation of invention discussed herein is not applied to a generic content retrieval service that the search engines provide.

The results of a search are skewed by the SEO of content. Typically, an artificial ranking algorithm leaves room for cheating and the SEO is an entire industry based on this. Only live human beings may reliably rank document content. After all, it takes us 11-12 years at school and few more years at a university to first become capable and later become better at doing this. Further, the rank only makes sense in the terms of the query that led to the document fetch in a first place ("query" here refers to one or more of the end user query sent to a search engine, document title, keyword or phrase tags provided by the document author, inbound link descriptions), However, hiring people to assist the World Wide Web document ranking is inefficient, moreover, the semantic diversity and fragmentation continue at an ever increasing pace. In addition, peer-to-peer networks are gaining popularity and are found in enterprise software applications. However, in a peer-to-peer network, content may not be publically visible and cannot be indexed by the existing Web search engine servers that gather Internet content, referred to as crawlers.

Typically, the crowd-sourcing effort can mitigate the SE issue. Presently, human assisted content tagging is the predominate solution. Sites like ≦Digg.com≧ (Digg Inc.), ≦Delicio.us≧, ≦XMarks.com≧ (XMarks Inc, formerly FoxMarks) do exactly this and continue to gain popularity. In some solutions, local to the user browser, document bookmarks are being uploaded to the site and then used for ranking. A social component is being introduced—for instance as discussed in U.S patent application 2005/0091202. In other web sites, like ≦Digg.com≧ for instance, the user must manually submit the document location and tag it with appropriate keywords. Thereafter, the other ≦Digg.com≧ users vote for the document content, thus increasing the document rank and accessibility. Whatever the solution is, an explicit user action is required for the tagging to work. However, explicit action lowers the coverage of content.

Further, manual tagging can be incomplete or incorrect. It reintroduces and reinforces the ranking issues seen before Google released their inbound link based page-ranking algorithm. An even worse problem lies in the fact that the search query (document link that led to the content promotion in a first place) is not captured. Manual reintroduction of the keywords during the tagging process, by somebody else but the author, can introduce spam. Some solutions like that provided Jookster.com mitigate the spam issue by limiting the search scope.

To summarize, the one or more prior art in this technology domain have one or more of the following disadvantages:
 (a) Document ranking is an artificial ranking algorithm based on inbound links, and a subject of successive attacks. The documents ranking is currently being abused by the aggressive SEO that leads to less relevant results.
 (b) Since the inexact user queries are either too generic or too specific, to assist the SEO techniques to gain edge by considering the already skewed document content rank. As result, the search engines provide not so relevant documents as top recommendations in the result-set.
 (c) Crowd-sourcing efforts though popular, require explicit action to be taken by the user. As a result the coverage is lowered.
 (d) Tagging breaks the lookup query-document link and results in a rank that is not bound to the document semantics like the user or the author perceive it.
 (e) Addressing the semantics problem by injecting relevant keywords during the manual tagging process introduces spam.
 (f) Most tagging services operate as separate web sites, and to use their services the user must abandon a search engine of choice and migrate to the tagging service site. As a compromise solution, user visits two or more search engines and tagging service site interchangeably. This is inconvenient and can further lower the coverage of the tagging service.

Systems and methods are therefore desirable to manage user assisted ranking for document relevance recommendations and searching.

SUMMARY

The invention provides a system for ranking contents of one or more documents through human assistance. The system comprising one or more search engines configured to provide one or more documents based on a search query sent by a user. Further, the system comprises a client application configured to: capture the query sent by the user; capture one or more of the document title, meta tags as provided by the document author or inbound link descriptions (collectively referred as tags); monitor one or more interactions of the user with the one or more documents for one or more events; and provide a relevance measure to the one or more documents based on the captured query and the one or more events.

The invention further provides a method for ranking contents of one or more documents through human assistance. The method comprising capturing a query sent by a user to a search engine for the one or more documents, wherein the query is captured by a client application; capturing document tags as provided by the author, wherein the tags are captured by a client application; monitoring one or more interactions of the user with the one or more documents for one or more events, wherein the one or more interactions are monitored by the client application; and providing a relevance measure to the one or more documents based on the captured query and the one or more events.

The invention further provides a computer-readable medium containing instructions executable by a processor for performing a method for ranking contents of one or more documents through human assistance. The method comprising: capturing a query sent by a user to a search engine for the one or more documents, wherein the query is captured by a client application; capturing document tags for the one or more documents, wherein the tags are captured by a client application; monitoring one or more interactions of the user with the one or more documents for one or more events, wherein the one or more interactions are monitored by the client application; and providing a relevance measure to the one or more documents based on the captured query and the one or more events.

These and other objects and features of the present invention will become more fully apparent from the following description and appended claims, or may be learned by the practice of the invention as set forth hereinafter.

BRIEF DESCRIPTION OF THE DRAWINGS

In the drawings, closely related figures have the same number but different alphabetic suffixes.

DRAWINGS

Reference Numeral

Figure 1A:
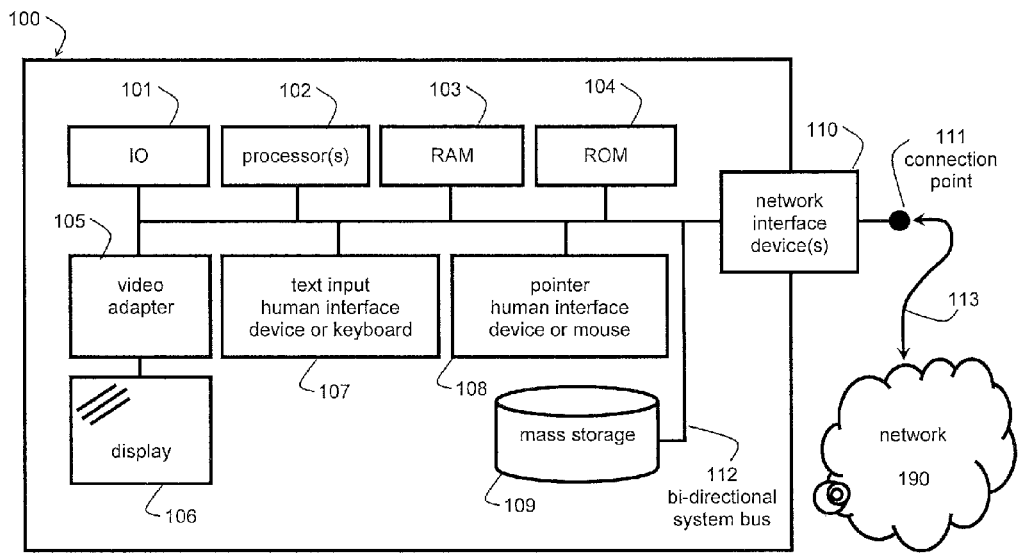
FIG. 1A is a block diagram illustrating an embodiment of a computing device in which an embodiment of the present invention can be implemented.

- 100—a computing device
- 101—10 (input/output) unit
- 102—processor (one or more central processing units)
- 103—RAM (random access memory) where runtime application state is being kept
- 104—ROM (read only memory) assisting the system startup and diagnostics
- 105—Video adapter
- 106—Graphical display
- 107—A human interface text input device; typically a keyboard
- 108—A human interface-pointing device: typically a mouse
- 109—mass storage where operating system and application data is being persisted
- 110—one or more network interface devices
- 111—connection points exposed by one or more network devices
- 112—bi-directional system bus
- 113—network link
- 120,121,122-servers
- 130—a wireless router
- 140,141—mobile phones
- 150—a network enabled gaming device
- 160, 161, 162, 163-computing workstation devices
- 190—a network the network interface may send data to and receive data from
- 191—a public network
- 192—a public mobile phone network
- 200—Software module—a browser plug-in or a monitoring process running in its own separate address space.
- 201—Internet or peer-to-peer network browser application
- 202—Browser's address (location) or search (lookup) bar query
- 203—Internet, local home/corporate or peer-to-peer network search engine
- 204—Search result of interest
- 205—User with a Human interface device
- 206—Document
- 300—Client application: a collection of plug-in 200, browser 201 and state 301
- 301—promotion vector
- 302—Server
- 303—Server farm
- 304—Promotion store
- 400—Requesting peer
- 401—Listening peer promotion store
- 402—Listening peer
- 403—Additional listening peers
- 500A—Information hub: server or server farm
- 500B—Information hub: peer
- 501—Recommendation looking peer(s)
- 700—the document rank (relevance) measure as function of time
- 701—document printing event and the associated event relevance jump 702—document book-marking event and the associated event relevance jump 703—the document relevance as function of time if no bookmarking and printing events are considered 704—the document relevance threshold value, above which a promotion request commences 800—the document relevance measure as function of time 801—the document relevance floor set by a prior document visit 802—period of inactivity appears as a plateau in the document relevance evolution with time 902—User fires a query against a search engine 904—Query intercept 906—The query executes on the search engine 908—Parallel query against promotion store 910—Is there a recommended document for the query? (logical block)

912—Both search engine and recommendation result sets displayed

914—User opens a result (document)

916—Interaction between user and document

918—Interaction events collected

920—Document closed

922—Relevance measure calculated

924—Measure above critical value? (logical block)

926—Promotion request posted

928—Wait for other document or query

DETAILED DESCRIPTION OF CERTAIN EMBODIMENTS

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A first embodiment of the invention is described with reference to FIGS. 2, 3, 5, 7, 8 and 9.

Embodiments of the invention described herein are generally directed to a computer-implemented system and a method for electronic document content ranking and more particularly to a computer-implemented system and method for managing user assisted ranking for document relevance recommendations and searching.

FIG. 1A is a block diagram illustrating an embodiment of a computing device 100 in which an embodiment of the present invention can be implemented. The computing device 100 can be a general-purpose computing device such a personal computer, a laptop, a Personal Desktop Assistant (PDA), a mobile phone and so forth. A human-interface pointing device or a mouse 108 and a human-interface text input device or a keyboard 107 are coupled to a bi-directional system bus 112. The human-interface devices 107 and 108 assist a user to provide input to the computing device 100 and communicate the input to a processor 102. Other suitable input devices can be used in addition to, or in place of, the mouse 108 and the keyboard 107. An I/O (Input/Output) unit 101 coupled to the bi-directional system bus 112 represents I/O systems such as a printer (not shown), an A/V (audio/video) I/O (not shown), etc.

The computing device 100 includes a video adapter 105 with its own or shared video memory (not shown), a Random Access Memory (RAM) 103 where both an application computer readable code and an application state are stored at runtime, a Read Only Memory (ROM) 104 that is generally responsible for keeping a system start-up computer readable code, a mass storage 109, all coupled with the bi-directional system bus 112 along with the I/O 101, the processor 102, the keyboard 107, and the mouse 108. The mass storage device 109 can include both fixed or removable media, such as magnetic, optical, flash memory and any other available mass storage technology implementation. The computing device 100 can have an embedded or external video display adaptor 105 capable of presenting graphical and textual information to the user. A display 106 can connect to the video adapter 105 through a video amplifier (not shown). The video amplifier is well known in the art. A circuitry converts digital pixels to a raster signal suitable for use by the display 106 that on its part displays a graphical image.

The computing device 100 can also include a network interface device 110 coupled to the buss 112. The network interface device 110 provides a two-way data communication coupling via a network link 113 through the device connection point 111. For example the network interface 110 can be a modem, a local area network (LAN) card, or a radio device. In any such implementation the network interface device 110 sends or receives electrical, electromagnetic or optical signals that carry digital data streams representing various types of information. More than one network interface devices 110 can be used. For example a Local Area Network (LAN) card can connect a computer workstation to the Internet (through an Internet Service Provider), while a wireless card can connect the workstation to a mobile device like a wireless enabled gaming device for instance.

The computing device 100 can send and receive data, including program code or web documents through the network link 113, the connection point 111, the network interface device 110 and the bus 112 to the processor 102 and then to the memory modules. The data received may be executed by the processor 102 or stored to the mass storage device 109.

Figure 1B:
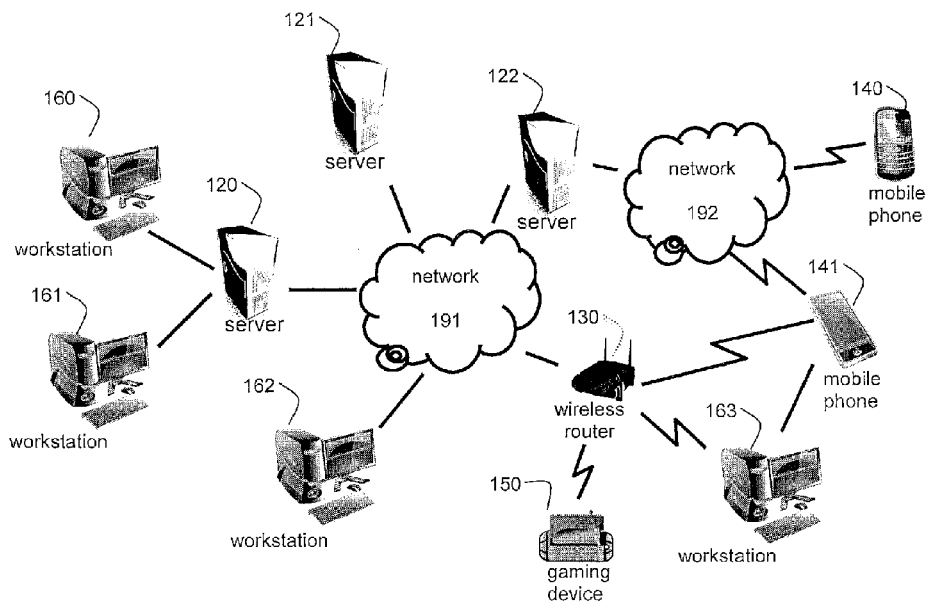
FIG. 1B is a diagram illustrating a typical distributed system in which an embodiment of the present invention can be implemented.

FIG. 1B is a diagram illustrating a typical distributed system in which an embodiment of the present invention can be implemented. As illustrated in FIG. 1B, the system includes a network setup with various types of computing devices linked through network interface components. For instance, computer workstation devices 160 and 161 connect to a public network 191 through a gateway or a proxy server 120. A computing device 162 and a server 121 are directly linked to the network 191. A server 122 bridges the network 191 to a public wireless network 192. Through a public network 192, mobile phone devices 140 and 141 connect to each other or access resource of the public network 191, for example, the server 121. A wireless router 130 enables the mobile phone 141 to connect to a home or office local network. The wireless router 130 establishes a communication channel among a wireless network enabled gaming device 150, a workstation 163, and the mobile phone 141. Further, the mobile phone 141 may be connected through wired interface of a Universal Serial Bus (USB) to the workstation 163. The computing devices can receive and send data between each other by using the various network interfaces discussed above. In case of a web document, the processor 102 processes the data of the web document by using a computer application code commonly referred to as an Internet browser. Most modern network-enabled end-point computing devices include at least a basic browser implemented and available as an application code on them.

Application code may be embodied in any form of computer product. A computer program comprises a medium configured to store or transport computer readable code or data, or in which computer readable code or data may be embedded. Some examples of computer product include CD-ROM discs, DVD disks, ROM cards, computer hard drives, servers on a network, carrier waves, other removable media. An embodiment of the invention can be implemented as computer software in the form of computer readable code execute in a general-purpose network-enabled computing device.

The computing device systems described above are for the purposes of example only. The current and the alternative human assisted document content ranking and recommendations embodiments may be implemented in any type of a network-enabled computing device capable of rendering textual or graphical document data.

For the reminder of this document the terms 'relevance' and 'rank' are used interchangeably when related to a document or the underlying document content.

Figure 2:
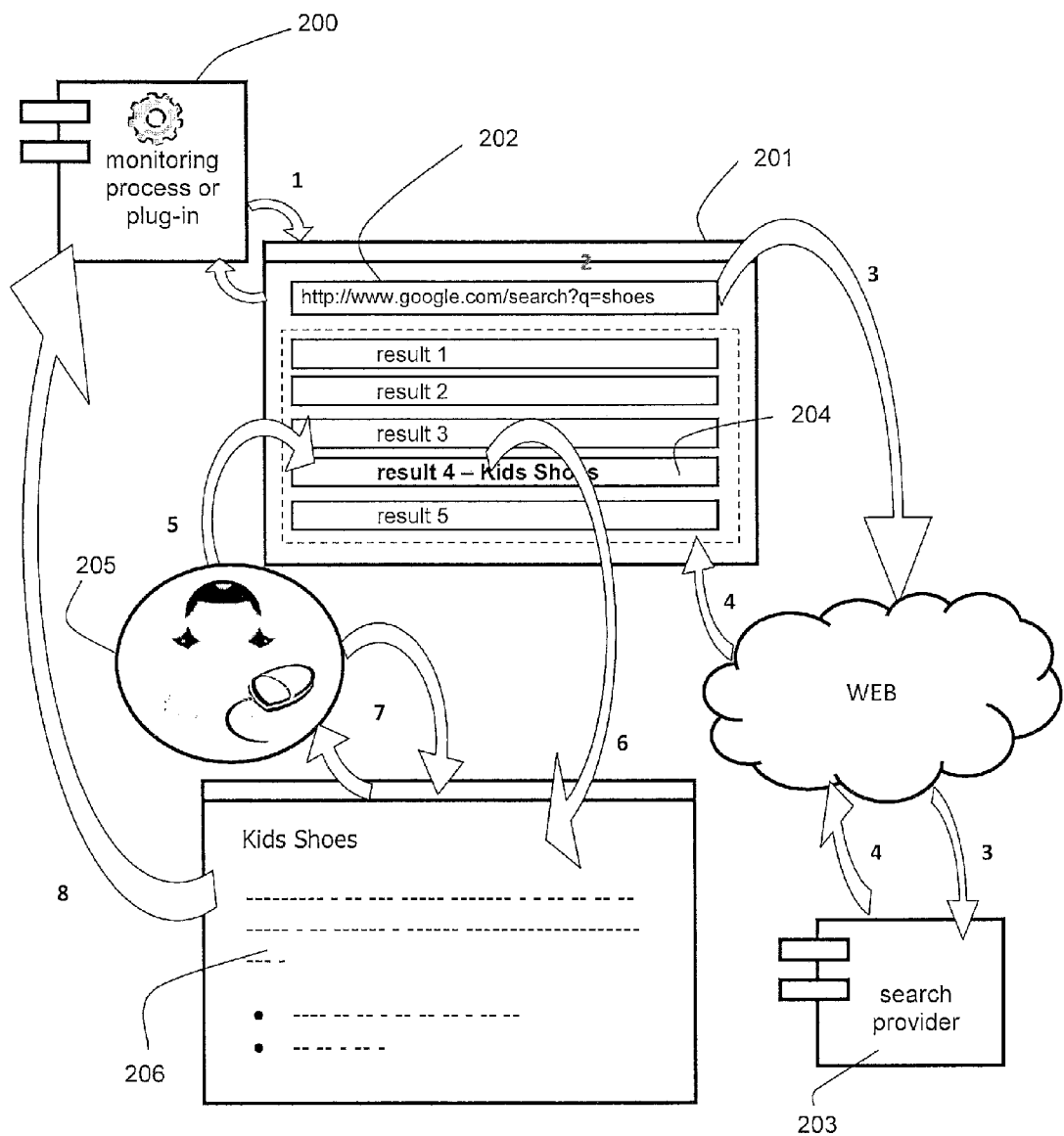
FIG. 2 illustrates a process of soliciting implicit human recommendations in the context of a search engine query.

FIG. 2 illustrates a process of soliciting implicit human recommendations in the context of a search engine query. Typically, the monitoring process requires software to be installed on a client machine and run in parallel to or into one or more Internet browsers 201. However, the monitoring piece can be incorporated into the browser itself, thus eliminating the requirement to install additional software. As illustrated in FIG. 2, a software module 200 monitors and records the browser's address or a search bar query 202 sent to a known search engine. Examples of the search engine can include, but are not limited to Google, Yahoo, and Bing, etc. The module 200 should be capable of intercepting human interface events tied to the browser. The recommended events includes, but are not limited to: pointer or keyboard related scrolling, pointer clicks or touches, zooming, keyboard data entry events, printing, saving, book-marking, copying document location as a Universal Resource Locator (URL), navigating away, switching to a different application or browser tab. Apart from the richness of the events supported, other software module implementation details are not in any way limiting the present embodiment. For instance, the software module 200 can be provided as an integral part of the browser, implemented as a browser plug-in, if the browser architecture allows for it, or the software module 200 is implemented as a stand-alone application running in a separate from the browser's one or more processes address space. Further, the module can be implemented as one or more scripts that run within the browser itself or in a separate process. A particular instance from the collection of all the various stand-alone module implementations, together with all the various browser-hosted implementations, including implementations distributed as part of the browser itself, is to be referred to as a client application. As discussed earlier, the client application implementation choice is non-limiting, provided different implementations capable of intercepting same set of human interface events.

The query 202 is sent to the Internet, local home/corporate or peer-to-peer network search engine 203. As a result, a list of related documents are returned and rendered in the search engine graphical user interface. Thereafter, a user 205 clicks on a search result of interest 204 to fetches a document 206 recommended by the search engine. The document 206 is loaded in the same or a new browser window, and more importantly, it maintains the association with the query 202. The software module 200 keeps a note of the association. Subsequently, the software module 200 monitors or screens the interaction of the user 205 with the document 206.

As a first step, the user 205 skims the document 206 to do a quick assessment of the relevance of the document 206. In case, the document 206 does not pass the test, the browser window is to be closed if the document 206 was loaded in a separate window. In other case, if the document 206 does not pass the test the user 205 is navigated away or back to the query results or other another web page. The time taken before navigating away or back can be approximately a second or up to few seconds depending on the length of the document 206. The word count, document fragmentation, and the like can be incorporated into the definition of the length of the document 206 for obtaining the best results. During the skimming period, the user 205 may scroll, adjust browser window dimensions, adjust fonts, etc. As a consequence, there is a period of active interaction with the document that leaves an eventful trace.

In case the document 206 passes the initial screening process, the user 205 is likely to return to the title or section of interest of the document 206 and start reading it. Reading can take significantly more time than quick skimming of the document 206. In active reading interaction between the user 205 and the document 206, the event trace left may contain a few scrolling or clicking events over a longer period of time as compared to that of the skimming time period. This behavior demonstrates at least basic interest in the document content. In one extreme case, there may be no interaction after the initial screening. This may indicate the user 205 is away from the desk. A filter discriminates reading from other activities of the user 205. Events like navigating away, switching to other application or opening a new browser instance leave a trail and can be handled easily.

After reading the document 206 or a fragment of the document 206, the user 205 may go further: for instance the user 205 can bookmark the location or print the contents of the document 206. Printing can be an ultimate indicator of the relevance of document 206. Moreover, bookmarking also indicated the relevance of the document 206. Further, other interactions like saving, document address copying, frequent document visits in a relatively short time period also signify the importance or relevance of the document 206.

In addition to fetching a document through a search engine, the user may type the document location directly, or use a document location shortcut, bookmark or inbound link. In this case, the semantic domain of the document is defined by one or more of the title, meta tags provided by the document author herself, or inbound link descriptions (collectively referred to as "tags"). The document title, meta tag keyword, meta tag description or other author provided tags, inbound link descriptions play the same role the user typed query to a search engine has in defining the perceived semantic domain of the document.

An objective measure of the relevance of a document may not have a linear relationship with the interaction time of a user. For example, lets consider that the user 205 reads the document 206 once and then rereads the most significant portions of the document 206 again. It is possible that the second read may consume approximately the same amount of time as consumed in the first read. As a result, the overall the time spent on the document 206 can close to two fold the time spent in the first interaction. However, this does not mean that the document 206 is two fold more relevant as it was examined twice in a single user interaction. Therefore, beyond certain threshold, the objective measure for the interaction time can be defined as increasing slowly with time. The simplistic choice is a logarithm function, however, other slowly increasing overtime functions can also be selected.

In most general terms, the objective measure $m_{\langle query, document \rangle}$ for the document rank (relevance), in the context of the last query, can be described mathematically as:

$$m_{\langle query, document \rangle} = \begin{pmatrix} a_0 \log\left(b\frac{t}{l} + c\right) + a_1\delta(P) + \\ a_2\delta(B) + a_3\delta(S) + \\ a_4\delta(C) + a_5\rho_T(V) \end{pmatrix} \exp(-D(1-L))$$

where: t is the cumulative document interaction time with the period of inactivity excluded; l is the effective document length, the $$\delta(P) = \begin{cases} 1 & \text{if printed} \\ 0 & \text{if not printed} \end{cases}$$

is the document printed Dirac measure; $\delta(B)$, $\delta(S)$, $\delta(C)$ are the document bookmarked, document saved, document location or portion of the document content copied Dirac measures respectively; $\rho_T(V)$ is the average document view density since first seen; L is the number of links followed since the engine result list page; D determines if documents visited via navigation through the chosen search results should be considered as related to the original query or not; $a_{0-5}$ are coefficients determined experimentally and they define the weight of each document relevance indicator. The coefficient values may vary from user to user reflecting the fact different people interact with documents and organize information in different ways. The $\exp(-D(1-L))$ adjustment reflects the fact, the further one moves from the query result page, the less correlated the initial query and the currently viewed document may be. As previously discussed, the logarithm in the $$\log\left(b\frac{t}{l} + c\right)$$

member can be easily substituted with another slowly increasing overtime function. The coefficients have the following meaning: b scalling, c—is a small positive value that offsets the argument, so we avoid handling the negative values the logarithm produces in the 0 argument value vicinity.

The effective document length definition varies by the document type. For instance, one defines effective length as word or paragraph count for a textual type of document, non-empty cell count for spreadsheets, data-series and/or experimental point count superposition in charts, length in time for movies and songs, songs, and so forth. A sample document view density definition, given for illustrative purposes, is:

$$\rho_T(V) = \log\left(e_T \frac{\sum \delta_T(V)}{1+t-t_0} + 1\right)$$

$$\text{where } \delta_T(V) = \begin{cases} 1 & \text{if viewed in a given day} \\ 0 & \text{if not viewed in a given day,} \end{cases}$$

t is today's date, $t_0$ is the day the document was first viewed, $e_T$ is a constant dependent on the time slot T used. Instead of using a daily time slot T one can choose to define $\rho_T(V)$ using hourly, weekly, bi-weekly, monthly, and generally arbitrary time slots. It can depend on the target audience, and document type in terms of semantics. The present embodiment does rely on hints from the query figuring what time interval is most suitable. If the document semantics cannot be determined from the query and document content, the view density may be ignored while calculating the document rank or a default time slot (if defined) can be used.

The measure and document length as defined here, are just illustrative and should be considered limiting. $m_{\langle query, document \rangle}$, t, and $\rho_T(V)$ can be defined with other different expressions. However, this does not obscure the fact that human interaction with the document is the ultimate evidence that determines the document rank. The rank only makes sense in the query or author defined context, and the implicit event trace is sufficient to objectively measure the document rank in the context of the query or document tags. Further references to "query" relate to one or more of the user query, document title, author defined meta tags, inbound link descriptions.

Once the measure is calculated, if for a given $\langle$ query, document$\rangle$ vector, the measure exceeds a threshold value $m^{critical}_{\langle query, document \rangle}$ then the vector should be promoted.

Figure 7:
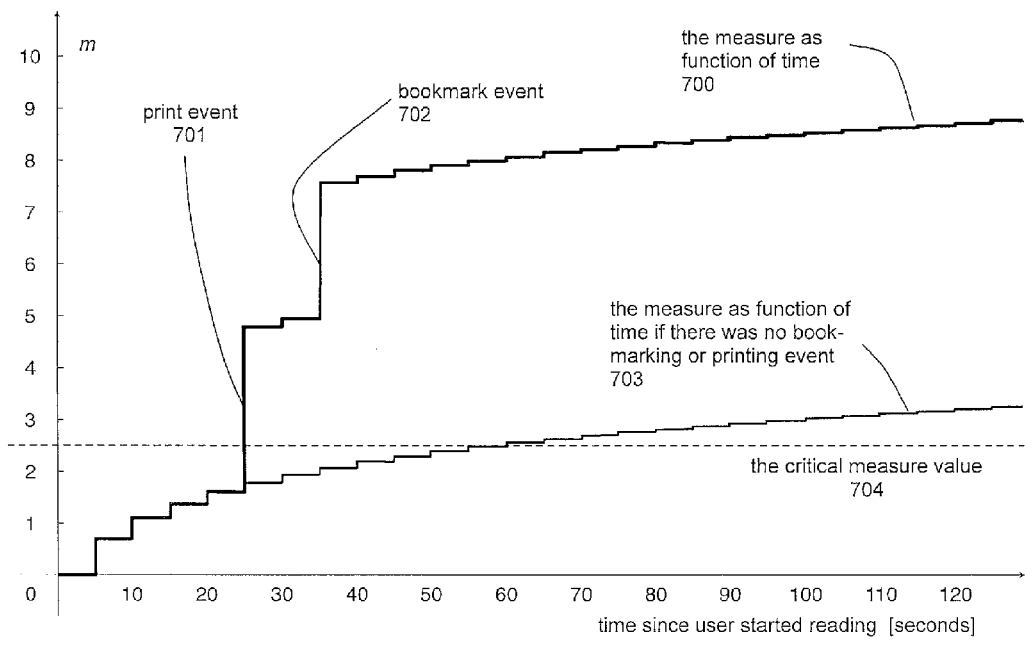
FIG. 7 illustrates a user document interaction that result in the document rank to be evaluated above the threshold measure value in accordance with an embodiment of the invention.
Figure 8:
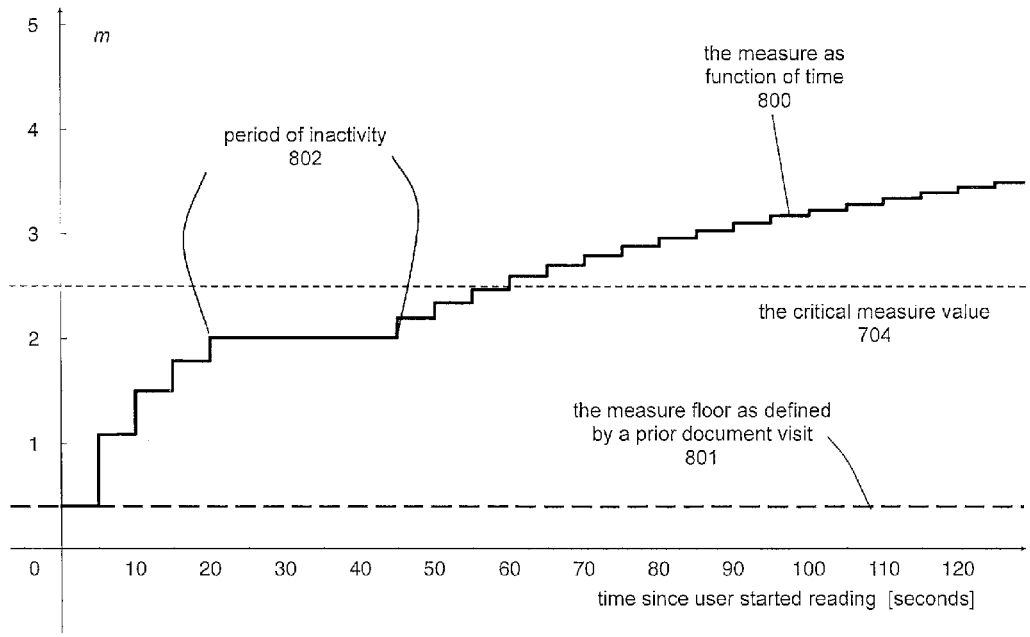
FIG. 8 illustrates a user document interaction that result in the document rank to be evaluated above the threshold measure value in accordance with an alternative embodiment of the invention.

FIG. 7 and FIG. 8 both illustrate exemplary user document interactions that result in the document rank to be evaluated above the threshold measure value, $m^{critical}_{\langle query, document \rangle}$ and a promotion request sent as a consequence. The coefficient values used during the executions can be for example:

$a_0=2.3; a_1=3; a_2=2.5; a_3=2.5; a_4=0.5; a_5=0.4$

The above coefficient values indicate that the action of printing the document 206 was given a higher weight than saving or bookmarking the document 206. The URL or content copying was not considered too significant as there is no evidence whether the copied URL or content was actually used later in an email, a document, a social site, etc. The prior visit factor accounts for visits in the same day and was given relatively low weight too. The events are collected continuously, and are pushed to single element slots by event type and evaluated at 5-second intervals. Therefore, there are discrete steps on the graphs. As illustrated in FIG. 7, a printing event 701 and a bookmarking 702 events occur at a difference of 10-15 seconds. The printing event 701 alone boosts the document relevance measure 700 above the threshold measure value $m^{critical}_{\langle query, document \rangle}$ 704, which is set to 2.5 during this exemplary execution. The bookmarking event 702 confirms the document relevance, however, it may not be required in the present case for a promotion request to be initiated.

FIG. 8 illustrates an exemplary interaction between the user 206 and the document 206 during a same day but at later time. In this interaction, there is no bookmarking or printing events, however, a relevance floor 801 is set by the earlier visit. Further, there can be for example a 20 to 30 second period of inactivity 802 that appears in form of a plateau as a document relevance measure 800 evolves with time.

The exemplary executions illustrated in FIG. 7 and FIG. 8 and the parameter values listed should not be in any event considered as limiting the embodiment and are given here as illustrations only.

There are a couple of arrangements in which the $\langle$ query, document$\rangle$ vector promotions may be persisted and later used. The simplest one would be a typical client/server application scheme as illustrated in FIG. 3.

Figure 3:
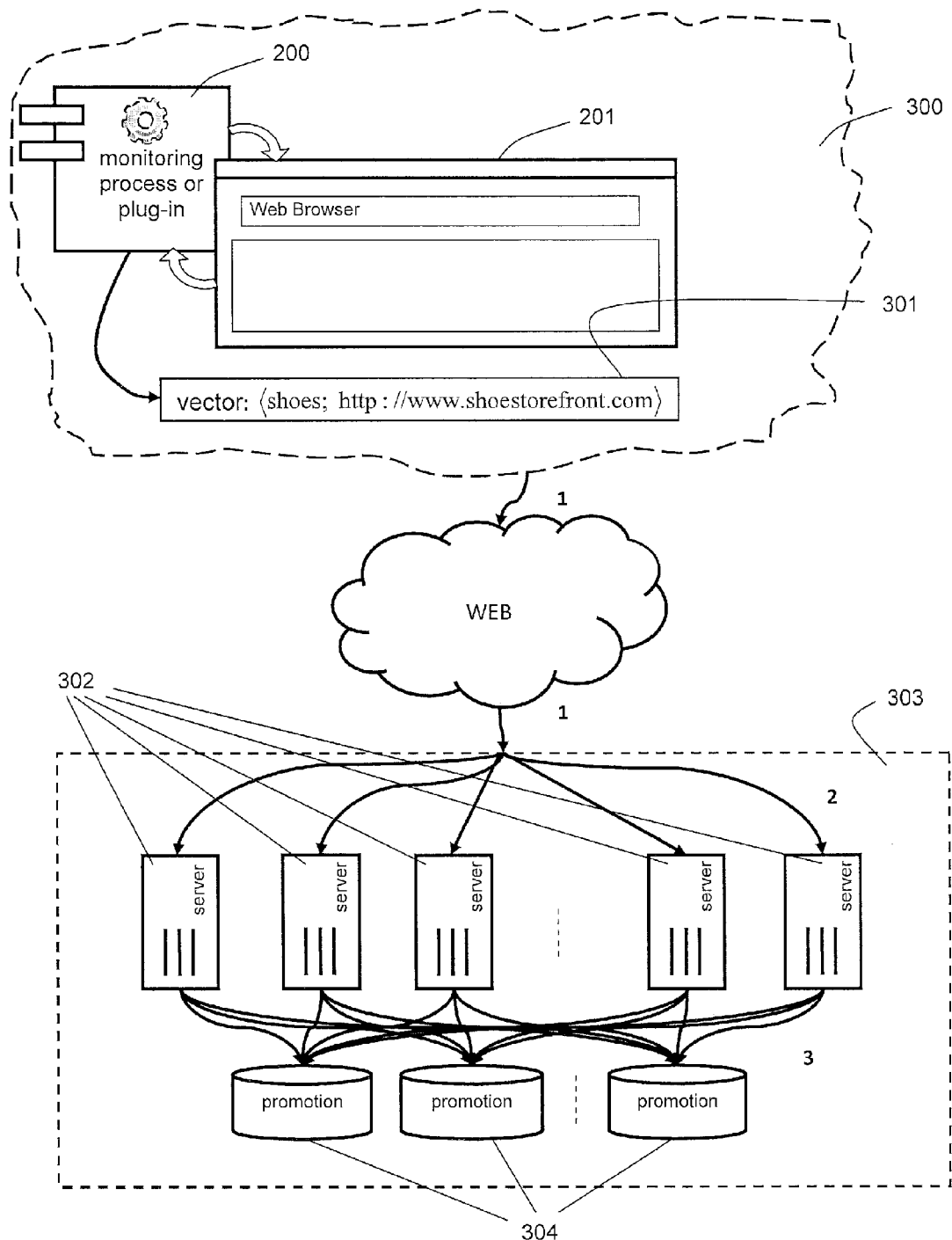
FIG. 3 shows a process for persisting a document recommendation in accordance with an embodiment of the invention.

FIG. 3 shows a process for persisting the document 206 recommendation in accordance with the first embodiment of the invention. In FIG. 3, a client application 300 comprises the browser 201, the software module 200, a vector 301 as an internal state. Further, the client promoting the vector 301 sends a request to a server farm 303 or directly to one of servers 302. Servers 302 or a server farm 303 accepts the request after considering and ruling out potential spamming. Spamming can be mitigated by limiting the number of promotions a client is entitled to in a given day, week, or month, i.e. by introducing a document promotion quota. The client may be identified: by an IP address; user name or other registration information, if the software module has support for user information or registration; by an installation identifier if the software module distribution can assign one during the download process; or by other means, like a domain account for instance, if both server and client run in a local network. The actual means for identifying the client may not be important, however the identification can assist on spam protection.

After the request is received on one of the servers 302 and spamming has been ruled out, the servers 302 checks whether the vector 301 exists on promotion stores 304. In case, the vector 301 is absent, it is added to the promotion stores 304. While persisting the vector 301, the servers 302 can add a promotion counter to it. The promotion counter is added as there can be queries that are used frequently.

In case the vector 301 exists in the promotion stores 304 and the vector 301 includes a promotion counter, then the promotion counter is incremented. In an embodiment of the invention, various promotions for different documents may take place due to document oversaturation in a particular query area. Therefore, choosing top 10, 20 or 100 documents can be difficult without introducing a ranking system that is internal to the promotion stores 304. In another embodiment of the invention, document oversaturation can be managed by organizing a first-in-first-out queue. Therefore, an internal store ranking system is required for the vector 301.

In an embodiment of the invention, the measure $m_{\langle query, document \rangle}$ may be an integral part of the vector 301. Therefore, instead of sending the vector 301, the requester makes a promotion request with the vector ⟨query, document, $m_{\langle query, document \rangle}$⟩. The measure is readily available and can be accumulated on the servers. Therefore, the document relevance for a given query becomes the sum of the individually reported measure $m_{\langle query, document \rangle}$.

Figure 5:
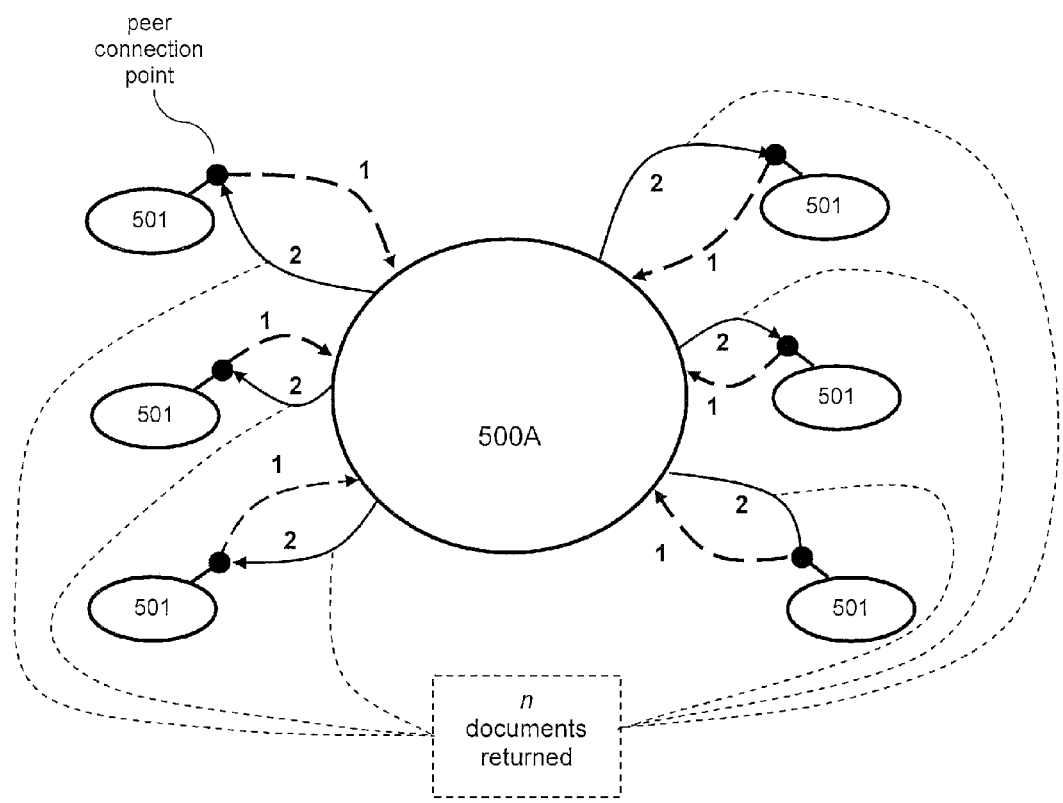
FIG. 5 shows a process for extracting recommendations in accordance with an embodiment of the invention.
Figure 6:
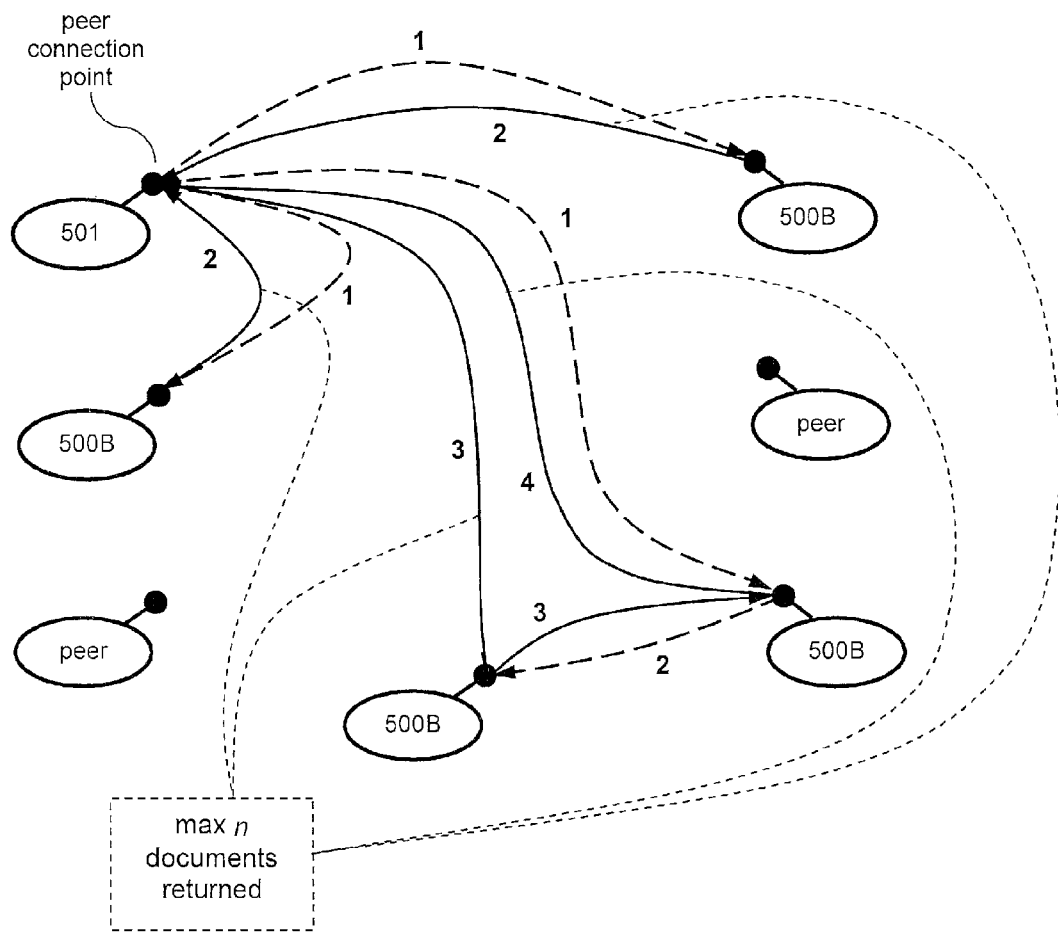
FIG. 6 shows a process for extracting recommendations in accordance with an alternative embodiment of the invention.

Querying the vector store generally depends on the arrangement for the vector index and the network topology. In the present embodiment, a high-level document store querying process is illustrated in FIG. 5. A peer 501 looking for recommendation looking is capable of intercepting a query sent to a search engine. After the interception of the query, the client runs a query parallel to a vector store server or hub 500A. The hub 500A queries its internal store for the term being sought and returns back to the client the n highly ranked documents for the phrase. The actual value for n is based on a requesting peer preference and can be provided as a configuration option. A good default value for n can be in range from 5 to 100, however, this should not be considered limiting to the embodiment.

Once the search engine results and articles recommended by hub 500A are available to the client adjusts the search engine user interface and lists the recommendations together with the search engine results (not shown). Moreover, the client adjusts the search engine user interface and displays the server 500A recommendations in a separate attached to the browser toolbox window or custom toolbar (not shown). The software module 200 enables simultaneous display of the two recommendation streams without the need to install or query explicitly an additional search engine.

As relevance data for a particular document accumulates, a semantic domain can be defined for the document based on the collected recommendations. Further, considering the accumulated query statistics, and the associated recommended documents, relationships can be uncovered those further expand or contract the document semantic domain. The Bayesian statistics that is well known in the art can be used by one or more embodiments for the analysis. [00120] An alternate embodiment of the invention is described with reference to FIGS. 2, 4, 6, 7, 8 and 9.

The alternative embodiment discusses using a different vector persisting and vector store querying mechanism. However, the requirement for monitoring human document interaction as discussed in conjunction with FIG. 2, the document rank measure calculation as discussed and illustrated in conjunction with FIGS. 7 and 8, the requirement for an internal vector store rank, and generally all the discussion not tied directly to FIGS. 3 and 5 remain valid and in effect for the alternate embodiment.

The alternate embodiment of the invention discusses a different network topology. In contrast to the discussion in FIG. 3, the alternate embodiment is based on a peer-to-peer network as a vector store. As a result, the vector store is distributed over multiple peers. The peer network organization and peer name resolution is of great importance when it comes to latency, network attack resilience, network stability, fragmentation, etc. In the alternative embodiment a generic second generation (distributed hash table) peer-to-peer network is considered. A few such peer-to-peer networks exist currently. For example, the peer-to-peer networks discussed in Tapestry (Ben Y. Zhao, et al.—IEEE Journal On Selected Areas In Communications, Vol. 22, No. 1, January 2004), Chord (Ion Stoica, et al., The proceedings of ACM SIGCOMM 2001, San Deigo, Calif., August 2001), Pastry (≦http://research.microsoft.com/antr/Pastry/≧), Kademlia (PetarMaymounkov, et al., The proceedings of 1st International Workshop on Peer-to-peer Systems 2002), and Microsoft PNRP (U.S Pat. No. 7,065,587 to Huitema et al, (2006)), and so forth (each of which is hereby incorporated by reference in its entirety).

Figure 4:
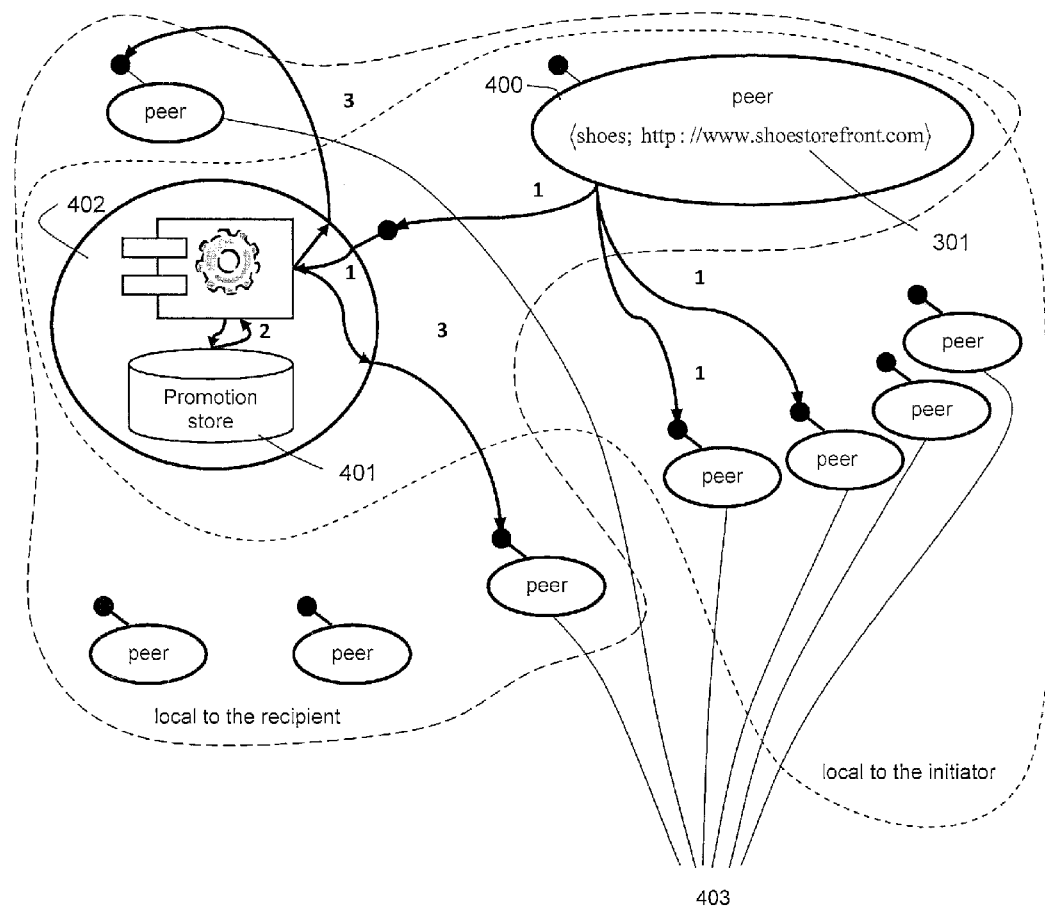
FIG. 4 shows a process for persisting a document recommendation in accordance with an alternative embodiment of the invention.

In the peer-to-peer network, as illustrated in FIG. 4, each requesting peer 400, listening peer 402, and additional listening peers 403 maintains their own promotion stores. The listening peer 402 includes a promotion store 401 as illustrated in FIG. 4. The promotion store 401 comprises the promotion vectors 301. In the store 401, there may or may not be a promotion counter associated with the vector rank value. The promotion counter is recommended in case of document oversaturation as discussed above, however, this does not limit the embodiment implementation details. A promotion request involves sending the ⟨query, document⟩ vector to a subset of p peers 402, 403 in the local neighborhood of q peers. The p/q ratio is determined experimentally, but any value in the range of 0 to 1 may produce less or more optimal result. In case, the vector 301 does not exist in the receiving peer vector store 401, the vector is injected in the vector store 401 and persisted. In case, the vector exists in the vector store 401, which can be because of other peer promotion or self promoted content, then the request may be forwarded anonymously to the receiving peer neighborhood at the discretion of the receiving peer. The receiving peer neighborhood may not match the neighborhood of the promotion-initiating peer. Therefore, the visibility of the relevant vectors increase over time as they propagate through the network. However, spam and spamming peers have to be considered carefully. In an embodiment, spam can be isolated into small subsets of the network by limiting the forwarding of promotion requests. At the same time the overall network can be considered spam free. The spam penetration depends on the network topology, peer resolution and forwards ratio. Fewer forwards lead to less spam, but also lead to a slow increase of the document visibility with time.

Extraction of recommendations is a different mechanism in case of a distributed index. In the peer-to-peer arrangement illustrated in FIG. 6, the requesting peer 501 sends the intercepted search engine query (not shown) to peers 500B in the neighborhood. Each peer queries a local vector store (not shown) and returns up to n documents. As previously discussed, different algorithms may be selecting the best n documents. Moreover, the value of n is configurable by the user. An optimal default value for n can be in the [1; 25] range. In case no document is found, the receiving peer at its discretion may forward the request to its neighbors. The fetched documents are sent directly back to the request initiator if the network topology permits. However, firewalls may have to be configured to allow this request. Moreover, other criteria may be considered, such as privacy concerns, etc. Thereafter, the response flows through the forwarding peer to the original requester.

During early stages, when there are only a few peers in the network, a hybrid schema is implemented, in which ⟨ query, document, rank⟩ triplets (not shown) are stored together into one or more hubs. The rank may be in form of, but not limited to promotion request counts or cumulative $m_{\langle query, document \rangle}$ from the promotion request. The content rich multiple hubs locate the relevant documents for majority or some content by targeting key phrases. Multiple hubs enable scalability of the system. The setup in case of multiple hubs is a superposition of the setup and mechanism discussed in conjunction with FIG. 5 and FIG. 6. In this case, the setup may initiate as discussed in FIG. 5 comprising a few hubs 500A. Subsequently, as more content is added and/or offloaded from the hubs 500A to the peers, the setup migrates to the setup discussed in FIG. 6 comprising a pure distributed vector store. In an embodiment, the hybrid scheme may remain active for a longer time to include a new content injection mechanism. The content appearing in the top results of the search engines has to be relied on, in case the content injection is not an integral part of the setup. However, this can be problematic in terms of recognizing the true value of the human assisted document content ranking. [00126] Most of the discussion above is focused on how the document relevance is measured quantitatively and objectively, and how the information related to the most relevant documents discovered is persisted and retrieved later. It should be noted that the user interaction with the browser is being monitored extensively, however, this is done in a stealth mode. Therefore, the user is not required to perform any special actions apart from the regular activities that are performed on the browser.

Figure 9:
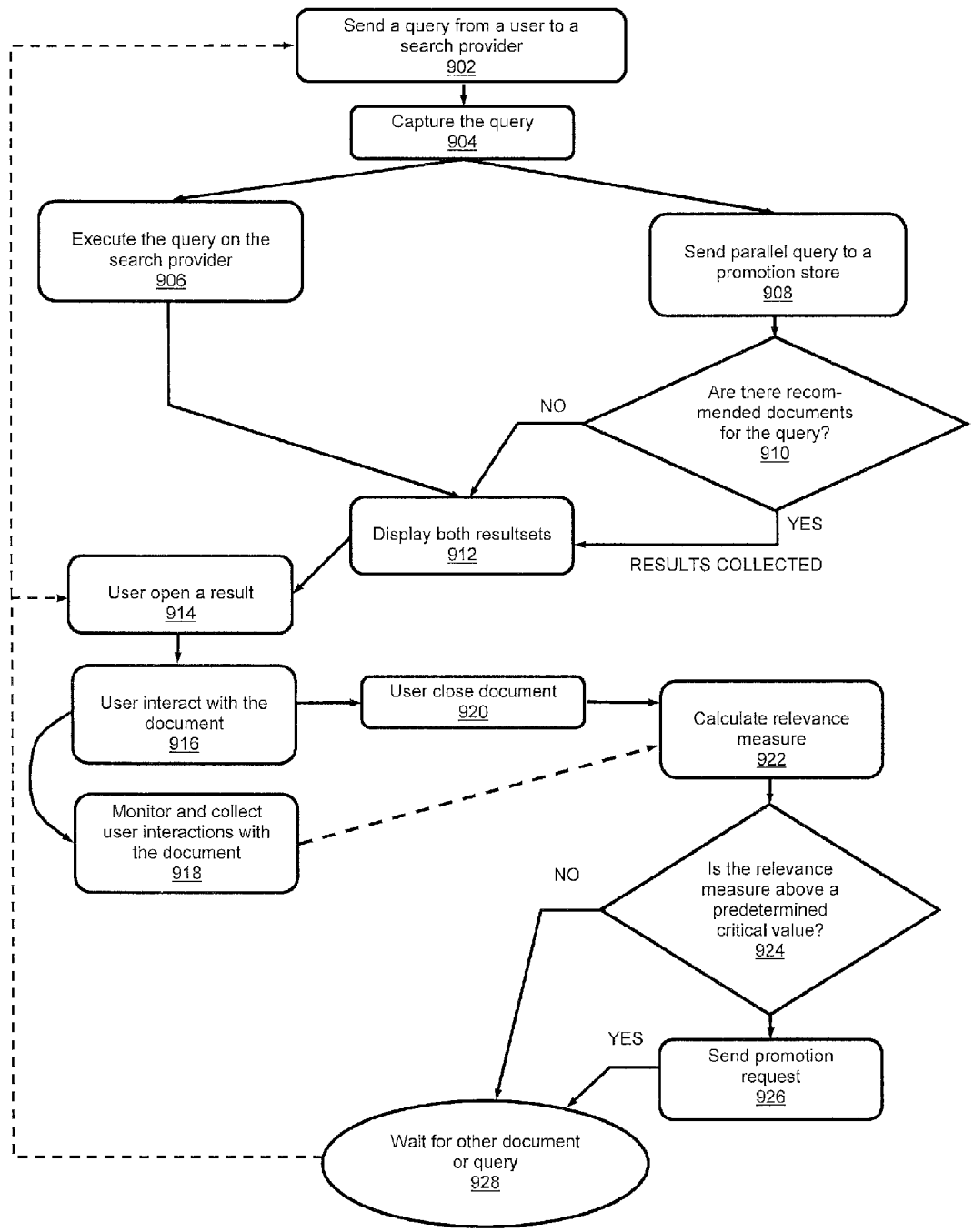
FIG. 9 illustrates a process for ranking contents of one or more documents through human assistance.

FIG. 9 illustrates a process for ranking contents of one or more documents through human assistance. At step 902, a user sends a query to a search engine of choice. The query is provided to search for documents required by the user. Subsequently, at step 904, the query is captured by a client application. In an embodiment of the invention, the client application is a browser plug-in. In another embodiment of the invention, the client application is a standalone application executing on a device of the user. Thereafter, at step 906, the search engine serves the original query request. The search engine searches for documents that may be relevant to the user based on the query. Further, the captured query is sent to promotion stores, at step 908. The captured query is executed on the promotion stores for retrieving documents important to the user based on the query.

At step 910, the promotion store tries to determine if the documents in the store are relevant. Subsequently, at step 912, the results from the execution of the search query by the search engine and the results obtained from the promotion store are displayed. The results are displayed irrespective of the outcome of the determination by the promotion store, at the step 910. Thereafter, the user opens a document at step 914 and the interaction between the user and the document commences at step 916. The interaction events between the user and the document are monitored and collected at step 918. The recommended events includes, but are not limited to: pointer or keyboard related scrolling, pointer clicks, zooming, keyboard data entry events, printing, saving, bookmarking, copying document location as a Universal Resource Locator (URL), navigating away, switching to a different application or browser tab. Apart from the richness of the events supported, other software module implementation details are not in any way limiting the present embodiment.

When the document is closed at step 920, the interaction events collected are used to calculate the document relevance measure at step 922. The relevance measure is calculated based on the events and the captured query. The mathematical expression for the calculation of the relevance measure is discussed in detail in conjunction with FIG. 2. Subsequently, at step 924 it is determined whether the relevance measure is above the predetermined critical value. In an embodiment of the invention, the predetermined critical value is decided by the user. In another embodiment of the invention, the predetermined critical value is decided by the client application based on the preferences and events monitored between the user and the documents.

In case, the relevance measure is above the predetermined critical value, then a promotion request is sent at step 926. In an embodiment of the invention, the promotion request is sent to other users in the network to provide a rank to the documents. In case the relevance measure is below the predetermined critical value, then the events cache is cleared and the process proceeds to step 928. Step 928 is an idle state until another document is opened or another query is executed at tile search engine.

The only interaction with the user required is after the search engine and the promotion store return their list of recommendations. At that point the software module 200 adjusts the search engine native page and injects human recommendations from the promotion store. Displaying the recommendations in a separate section directly on the search engines page is beneficial to the user, as all the results are available on a single page. Therefore, selecting any result is quick and convenient. Alternative the results can be listed in a browser sidebar or a browser toolbar, if the browser allows for these extensions.

The embodiments of the invention provide various advantages. These advantages of the embodiments will become apparent from a consideration of the ensuing description and accompanying drawings. The embodiments provide a lighter and more reliable document content rank evaluation with an inbuilt human quality.

The document relevance (rank) is defined and evaluated in the terms of the last query. Moreover, the relevance is measured by the human behavior and as a result produces human quality recommendations. The embodiments of the invention enable implicit soliciting and non-intrusive recommendations helps in achieving better document coverage that is faster than the explicit tagging systems, while considering same size user population. Furthermore, embodiments of the invention allow users to rely more heavily on each other's recommendations, thereby making SEO less relevant and attractive. Consequently, the algorithmic results of the existing search engines may improve.

The embodiments of the invention provide a quantitative way of measuring document relevance in the context of the last search query or, in case of direct document fetch, in the context defined by the document tags. Therefore, the results and recommendations are objective. Further, the links between the document and the query terms in which the document content was found relevant is preserved. As a result, a popular document may not spawn into unrelated semantic areas. The embodiments of the invention do not require the user to visit alternative sites or abandon her preferred search engine. Moreover, the quantitative document measure can be fine tuned to a particular user browsing experience and habits.

Embodiments of the invention enable the document relevance to be evaluated, persisted and retrieved in a highly fragmented peer-to-peer like network. Existing search engines rely on links quality and publicly accessible documents while evaluating document content rank, therefore, measuring document rank in a fragmented network may be problematic for them. It is difficult negatively influencing the content ranking process of the present invention.

The human assisted document content ranking embodiments can be used to provide quality recommendations supplemental to the existing search engine document lists. The human assisted document ranking system provides additional advantages. The embodiments of the invention enable human driven recommendations to supersede the artificial algorithmic recommendations, because of the better human recommendations quality. The document relevance is measured in its semantic realm as perceived by the actual document reader. Due to the distributed way in which the recommendations are collected and later promoted, the relevance measure is difficult to deceive or influence. The embodiments of the invention allow the document rank to be measured objectively in highly fragmented network with no or limited number of interconnecting links between the documents. The coverage is gained faster than in a similar size tagging system that relies on explicit actions taken by the user of the tagging system user, due to the implicit nature of recommendation gathering. The embodiments of the invention allow fine-tuning of the document rank measure to a particular user behavior.

The embodiments of the invention integrate well with the browser and provides for a seamless user experience. The user graphical interface is clear and familiar and helps in quickly locating the new recommendations and start navigating them. The embodiments allows for information lookup trends identification, as the recommendations solicited have implicit time component embedded. Further, the associated highly relevant documents already identified and collected can be easily presented in the trendy context.

Although the description contains many examples and specific mentions, these should not be considered as limiting the scope of the embodiments, but as merely providing illustrations of some of the presently preferred embodiments. For example, the document relevance measure can be defined in other common sense terms by substituting the logarithm of time with another slowly increasing function. The link depth mayor may not be considered while calculating the measure. Different coefficient values give different weight to different user actions and generally may be user fitted. In addition, the promotion store may have different structure and capture information in addition to the basic (query, document) vector and/or promotion count. More complex distributed network topology in the peer-to-peer embodiment may lead to more consistent recommendations across the entire network (leveraging sampling in a way similar as in some inverse keyword index studies); adding geography component to the store or the lookup request may lead to great local community oriented solutions. As mentioned, the real time search realm can be entered, if one considers both the document promotion time, and the query context in which the promotion took place. This gives enough information, so a list documents tied to trendy topics, conversations, etc. can be constructed and presented to the user.

Thus the scope of the embodiments should be determined by the appended claims and their legal equivalents, rather than by the examples discussed.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims

The invention claimed is:

1. A system for ranking contents of one or more documents, the system comprising:
   one or more search engines configured to provide one or more documents based on a search query sent by a user; and
   one or more processors executing a client application and configured to:
      capture the query sent by the user;
      capture one or more document tags;
      determine, with respect to at least one of the one or more documents, that the user has navigated the at least one of the one or more documents for at least a defined period of time, the defined period of time being defined based on at least one of (a) a length of the at least one of the one or more documents, (b) a word count of the at least one of the one or more documents, and (c) a fragmentation of the at least one of the one or more documents;
      monitor, based on a determination that the user has navigated the at least one of the one or more documents for at least the defined period of time, in relation to the at least one of the one or more documents, and throughout one or more time intervals, one or more interaction events, the one or more interaction events comprising one or more behaviors that demonstrate interest in the at least one of the one or more documents, each of the one or more interaction events having a respective weight that reflects a relative significance of the interaction event with respect to a relevance of the at least one of the one or more documents to the query; and
      compute, in relation to at least one of the query and the one or more tags, a relevance measure for the at least one of the one or more documents based on the one or more interaction events, the respective weights of each of the one or more interaction events, and the one or more time intervals.

2. The system of claim 1 further comprising:
   one or more promotion stores configured to:
      store the at least one of the one or more ranked documents;

store one or more vectors, wherein the vectors are based on at least one of (a) the captured query and the at least one of the one or more documents and (b) the one or more document tags and the at least one of the one or more documents; and
store one or more promotion counters associated with the one or more vectors.

3. The system of claim 1, wherein the client application comprises a browser plug-in.

4. The system of claim 1, wherein the client application comprises a browser.

5. The system of claim 1, wherein the client application is further configured to:
determine whether the relevance measure is above a predetermined critical value;
link the at least one of the one or more documents to a perceived semantic domain when the relevance measure is greater than the predetermined critical value; and
persist the semantic links to the at least one of the one or more documents.

6. The system of claim 5, wherein the semantic domain is perceived based on the captured query.

7. The system of claim 1, wherein the one or more behaviors comprise one or more of: a document printing, a document saving, a document copying, a document bookmarking, a document address copying, a number of document visits, a keyboard data entry, a document scrolling, a pointer clicking, a document zooming, a document switching, time spent in reading the document, and a webpage navigation.

8. The system of claim 1, wherein the one or more time intervals are normalized based on a length of the at least one of the one or more documents.

9. The system of claim 1, further comprising a display configured to display one or more search results to the user based on the relevance measure.

10. A computer-implemented method for ranking contents of one or more documents, the method comprising:
capturing, with one or more processors executing a client application, a query sent by a user to a search engine;
capturing one or more tags provided for the one or more documents;
determining, with respect to at least one of the one or more documents, that the user has navigated the at least one of the one or more documents for at least a defined period of time, the defined period of time being defined based on at least one of (a) a length of the at least one of the one or more documents, (b) a word count of the at least one of the one or more documents, and (c) a fragmentation of the at least one of the one or more documents;
monitoring, based on a determination that the user has navigated the at least one of the one or more documents for at least the defined period of time, in relation to the at least one of the one or more documents and throughout one or more time intervals, one or more interaction events, the one or more interaction events comprising one or more behaviors that demonstrate interest in the at least one of the one or more documents, each of the one or more interaction events having a respective weight that reflects a relative significance of the interaction event with respect to a relevance of the at least one of the one or more documents to the query; and
computing, in relation to at least one of the query and the one or more tags, a relevance measure for the at least one of the one or more documents based on the one or more interaction events, the respective weights of each of the one or more interaction events, and the one or more time intervals.

11. The method of claim 10 further comprising sending at least one of (a) the captured query and (b) the tags to one or more promotion stores for the at least one of the one or more documents.

12. The method of claim 10, wherein the client application comprises a browser plug-in.

13. The method of claim 10, wherein the client application comprises a browser.

14. The method of claim 10 further comprising determining whether the relevance measure is above a predetermined critical value.

15. The method of claim 14 further comprising linking the at least one of the one or more documents to a perceived semantic domain when the relevance measure is greater than the predetermined critical value.

16. The method of claim 15, wherein the semantic domain is perceived based on the captured query.

17. The method of claim 15 further comprising persisting a semantic link to the at least one of the one or more documents.

18. The method of claim 10, wherein the one or more behaviors comprise one or more of: a document printing, a document saving, a document bookmarking, a document address copying, a number of document visits, a document scrolling, a pointer clicking, a document zooming, a document switching, and a time spent reading the document.

19. The method of claim 10, wherein the one or more time intervals are normalized based on a length of the at least one of the one or more documents.

20. The method of claim 10, further comprising supplementing one or more search results provided to the user based on the relevance measure.

21. A non-transitory computer-readable medium containing instructions executable by a processor for performing a method for ranking contents of one or more documents, the method comprising:
capturing a query sent by a user to a search engine;
capturing one or more tags provided for the one or more documents;
determining, with respect to at least one of the one or more documents, that the user has navigated the at least one of the one or more documents for at least a defined period of time, the defined period of time being defined based on at least one of (a) a length of the at least one of the one or more documents, (b) a word count of the at least one of the one or more documents, and (c) a fragmentation of the at least one of the one or more documents;
monitoring, based on a determination that the user has navigated the at least one of the one or more documents, for at least the defined period of time, in relation to the at least one of the one or more documents and throughout one or more time intervals, one or more interaction events, the one or more interaction events comprising one or more behaviors that demonstrate interest in the at least one of the one or more documents each of the one or more interaction events having a respective weight that reflects a relative significance of the interaction event with respect to a relevance of the at least one of the one or more documents to the query; and
computing, in relation to at least one of the query and the one or more tags, a relevance measure for the at least one of the one or more documents based on the one or more interaction events, the respective weights of each of the one or more interaction events, and the one or more time intervals.

22. The computer-readable medium of claim 21, wherein the method further comprises:

determining whether the relevance measure is above a predetermined critical value;

based on the determining, linking the at least one of the one or more documents to a perceived semantic domain; and persisting the semantic link to the at least one of the one or more documents.

* * * * *